United States Patent
Suzuki

(10) Patent No.: US 9,395,973 B2
(45) Date of Patent: Jul. 19, 2016

(54) VIRTUAL MACHINE DEPLOYMENT METHOD, RECORDING MEDIUM, AND INFORMATION PROCESSING APPARATUS

(71) Applicant: FUJITSU LIMITED, Kawasaki-shi, Kanagawa (JP)

(72) Inventor: Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/524,020

(22) Filed: Oct. 27, 2014

(65) Prior Publication Data

US 2015/0128139 A1 May 7, 2015

(30) Foreign Application Priority Data

Nov. 7, 2013 (JP) ................................. 2013-231568

(51) Int. Cl.
*G06F 9/445* (2006.01)
*G06F 9/455* (2006.01)

(52) U.S. Cl.
CPC .............. *G06F 8/63* (2013.01); *G06F 9/45558* (2013.01)

(58) Field of Classification Search
CPC ................................. G06F 8/63; G06F 9/4558
USPC .......................................................... 718/1
See application file for complete search history.

(56) References Cited

U.S. PATENT DOCUMENTS

2009/0249354 A1  10/2009  Yamaguchi et al.
2013/0185715 A1*  7/2013  Dunning ............. G06F 9/45558
                                                          718/1

FOREIGN PATENT DOCUMENTS

| JP | 2002-278769 | 9/2002 |
| JP | 2009-245316 | 10/2009 |
| JP | 4815195 | 11/2011 |
| WO | 2011/117957 | 9/2011 |

* cited by examiner

*Primary Examiner* — Anna Deng
(74) *Attorney, Agent, or Firm* — Fujitsu Patent Center

(57) ABSTRACT

An information processing apparatus 10 specifies a second virtual machine that provides a service on which a first virtual machine depends. The information processing apparatus 10 sets a pointer between the first virtual machine and the second virtual machine by referring to application information associated with, for each application, a parameter type, of another virtual machine, that is used to create a disk image of a virtual machine associated with an application and that is attached when a resource is allocated to the other virtual machine. The information processing apparatus 10 deploys the first virtual machine and the second virtual machine by creating, in accordance with the pointer, a disk image of the second virtual machine or the first virtual machine from a parameter that is set when a resource of the first virtual machine or the second virtual machine.

5 Claims, 12 Drawing Sheets

FIG.3

| VSYS ID1 | VSYS ID2 |
|---|---|
| VSYS A | VSYS B |
| VSYS B | None |
| ⋮ | ⋮ |

| App | SET FILE | DEPENDENCY DIRECTION | PARAMETER TYPE |
|---|---|---|---|
| SLB | /etc/slb/slb.conf | BACKWARD DIRECTION | IP, MAC |
| Auth | /etc/auth.conf | BACKWARD DIRECTION | IP, MAC |
| DB | /usr/etc/db.conf | FORWARD DIRECTION | IP |
| ⋮ | ⋮ | ⋮ | ⋮ |

| VSYS ID | VM ID | REPRE-SENTATIVE IP | REPRE-SENTATIVE MAC | App | DEPEND-ENCY POINTER |
|---|---|---|---|---|---|
| VSYS A | VM1, VM2 | IP1 | MAC1 | Web | None |
| VSYS B | VM3 | IP2 | MAC2 | SLB | VSYS A |
| ⋮ | ⋮ | ⋮ | ⋮ | ⋮ | ⋮ |

16c

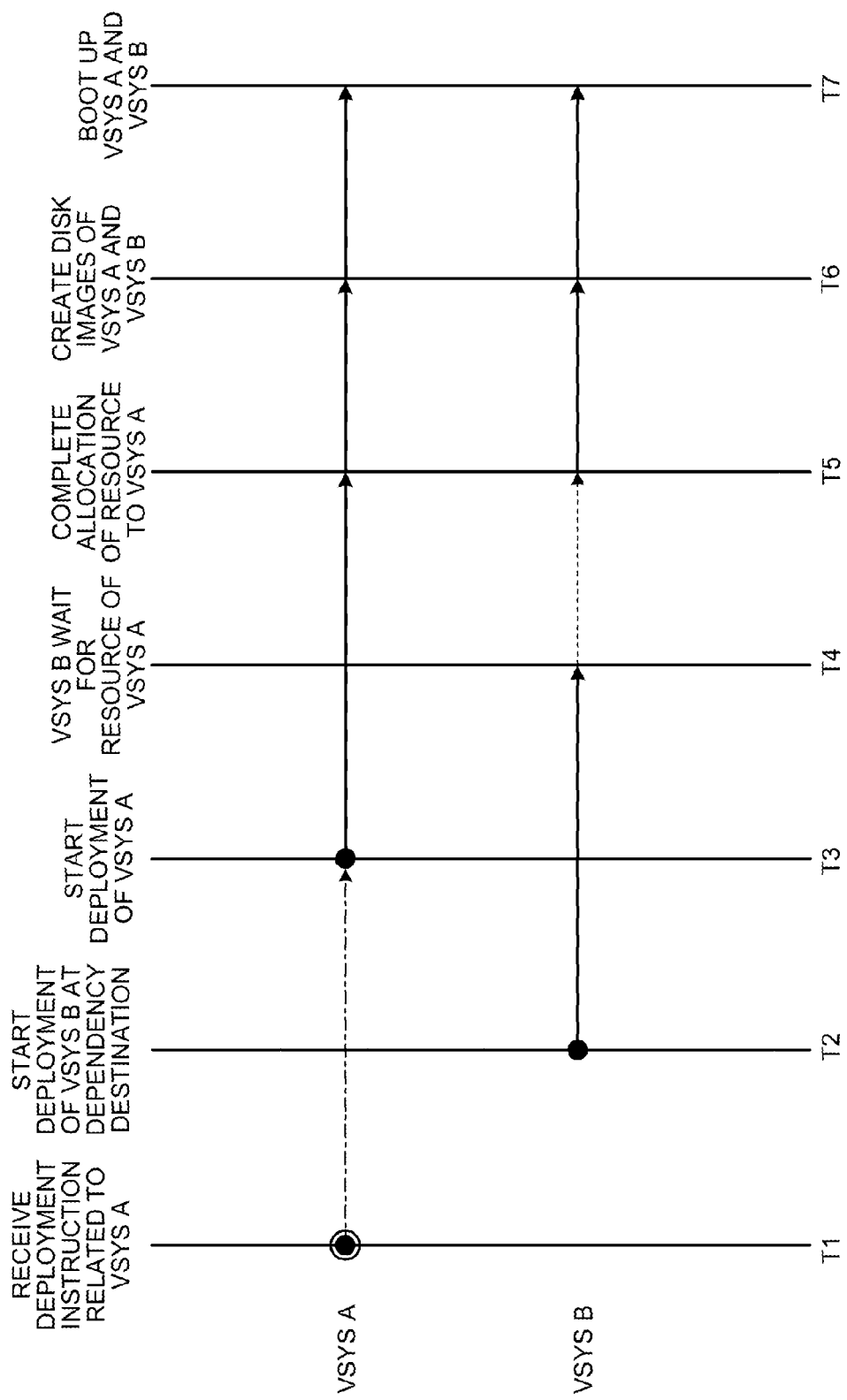

FIG.9

| VSYS ID | VM ID | REPRE-SENTATIVE IP | REPRE-SENTATIVE MAC | App | DEPEND-ENCY POINTER |
|---|---|---|---|---|---|
| VSYS A | VM1, VM2 | - | - | Web | - |
| VSYS B | VM3 | - | - | SLB | - |

| VSYS ID | VM ID | REPRE-SENTATIVE IP | REPRE-SENTATIVE MAC | App | DEPEND-ENCY POINTER |
|---|---|---|---|---|---|
| VSYS A | VM1, VM2 | - | - | Web | None |
| VSYS B | VM3 | - | - | SLB | VSYS A |

| VSYS ID | VM ID | REPRE-SENTATIVE IP | REPRE-SENTATIVE MAC | App | DEPEND-ENCY POINTER |
|---|---|---|---|---|---|
| VSYS A | VM1, VM2 | IP1 | MAC1 | Web | None |
| VSYS B | VM3 | - | - | SLB | VSYS A |

| VSYS ID | VM ID | REPRE-SENTATIVE IP | REPRE-SENTATIVE MAC | App | DEPEND-ENCY POINTER |
|---|---|---|---|---|---|
| VSYS A | VM1, VM2 | IP1 | MAC1 | Web | None |
| VSYS B | VM3 | IP2 | MAC2 | SLB | VSYS A |

FIG.12

| VSYS ID1 | VSYS ID2 | VM |
|---|---|---|
| VSYS A | VSYS B | VM1, VM2 |
| VSYS B | None | VM3 |
| ⋮ | ⋮ | ⋮ |

FIG.13

| VM ID | CPU | MEMORY | IP | MAC | App | DEPENDENCY POINTER |
|---|---|---|---|---|---|---|
| VM1 | 1GHz | 1GB | IP1 | MAC1 | Web | None |
| VM2 | 2GHz | 2GB | IP2 | MAC2 | DB | None |
| VM3 | 1GHz | 1GB | IP3 | MAC3 | SLB | VM1 |
| ⋮ | ⋮ | ⋮ | ⋮ | ⋮ | ⋮ | ⋮ |

VIRTUAL MACHINE DEPLOYMENT METHOD, RECORDING MEDIUM, AND INFORMATION PROCESSING APPARATUS

CROSS-REFERENCE TO RELATED APPLICATION

This application is based upon and claims the benefit of priority of the prior Japanese Patent Application No. 2013-231568, filed on Nov. 7, 2013, the entire contents of which are incorporated herein by reference.

FIELD

The embodiments discussed herein are related to a virtual machine deployment method and the like.

BACKGROUND

A virtualization technology is known that operates virtual computers called virtual machines (VMs) in information processing apparatuses, such as physical servers. For example, the virtual machines are deployed in physical machines in the course of a process of allocating resources to the virtual machines, creating disk images of the virtual machines, and then booting up the virtual machines. By combining such virtual machines, multiple virtual machines are sometimes packaged and then deployed as a virtual system that implements a single service.

Patent Document 1: Japanese Laid-open Patent Publication No. 2009-245316
Patent Document 2: International Publication Pamphlet No. WO 2011/117957
Patent Document 3: Japanese Laid-open Patent Publication No. 2007-140791
Patent Document 4: Japanese Laid-open Patent Publication No. 2002-278769

However, in the technology described above, there may sometimes be a case, as described below, in which it is not possible to deploy a virtual machine that depends on a service provided by another virtual machine.

Specifically, from among virtual systems, there is a virtual system that depends on a service provided by a process performed by another virtual system. This type of virtual system is not able to be deployed unless a counterpart virtual system on which the virtual system depends is booted up. However, that does not mean both virtual systems need to be simultaneously booted up.

For example, in a case in which a request a virtual system A to be deployed is received, if the virtual system A depends on a service performed by a virtual system B, the virtual system A is not able to be deployed unless the virtual system B has been booted up. Accordingly, even if an attempt to simultaneously boot up the virtual system A and the virtual system B is made, when a boot up of the virtual system B depends on the parameter of the resource that is allocated to the virtual system A, a deadlock may possibly occur in the deployment of the virtual system A and the virtual system B. Specifically, because acquiring of the parameter of the virtual system A fails when the virtual system B is booted up, the deployment of the virtual system B fails and thus the deployment of the virtual system A also fails.

In the above description, deployment of the virtual system that depends on a service performed by another virtual system has been described. However, because a deadlock is also occurs in a similar manner as in the virtual system described above even when a virtual machine that depends on a service provided by another virtual machine, the deployment of the virtual machine fails.

SUMMARY

According to an aspect of an embodiment, a virtual machine deployment method includes: specifying, using a processor, a second virtual machine that provides a service on which a first virtual machine depends; setting, using the processor, a pointer between the first virtual machine and the second virtual machine by referring to application information associated with, for each application, a parameter type, of another virtual machine, that is used to create a disk image of a virtual machine associated with an application and that is attached when a resource is allocated to the other virtual machine; and deploying, using the processor, the first virtual machine and the second virtual machine by creating, in accordance with the pointer, a disk image of the second virtual machine or the first virtual machine from a parameter that is set when a resource of the first virtual machine or the second virtual machine is allocated.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a schematic diagram illustrating an example of the dependency relationship table;
FIG. 6 is a schematic diagram illustrating an example of an application management table;
FIG. 7 is a schematic diagram illustrating an example of a resource management table;
FIG. 8 is a schematic diagram illustrating an example of a timing chart;
FIG. 9 is a schematic diagram illustrating an example of an example of the transition of the resource management table;
FIG. 12 is a schematic diagram illustrating an application example of the dependency relationship table;
FIG. 13 is a schematic diagram illustrating an application example of the resource management table.

DESCRIPTION OF EMBODIMENTS

Preferred embodiments will be explained with reference to accompanying drawings. The present invention is not limited to these embodiments. Furthermore, the embodiments can be used in any appropriate combination as long as the processes do not conflict with each other.

[a] First Embodiment

System Configuration

Figure 1:
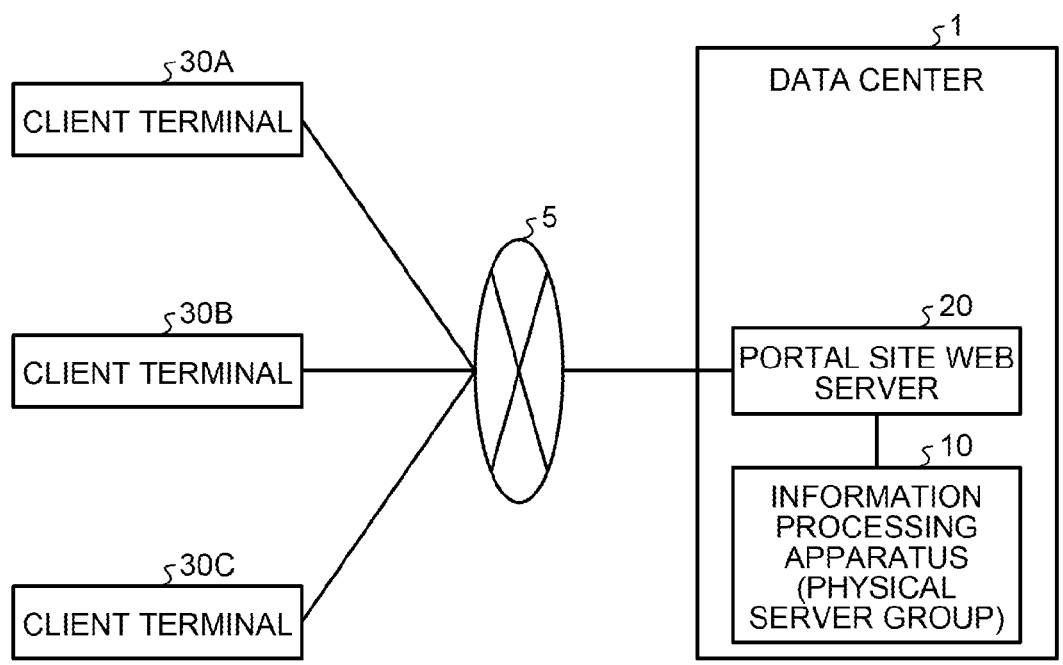
FIG. 1 is a schematic diagram illustrating an example configuration of a system according to a first embodiment.

FIG. 1 is a schematic diagram illustrating an example configuration of a system according to a first embodiment. The system illustrated in FIG. 1 provides client terminals 30A to 30C with a service, such as Infrastructure as a Service (IaaS) or the like, due to virtualization of a server executed by an information processing apparatus 10.

The system illustrated in FIG. 1 accommodates therein the client terminals 30A to 30C and a data center 1. Furthermore, the data center 1 includes a portal site Web server 20 and the information processing apparatus 10. FIG. 1 illustrates three client terminals; however, the data center 1 may also accommodate an arbitrary number of client terminals. In a description below, if there is no need to distinguish among the client terminals 30A to 30C, the client terminals 30A to 30C may sometimes be collectively referred to as a "client terminal 30".

The data center 1 is connected to the client terminal 30 via a network 5 such that they can communicate with each other. Any kind of communication network, such as the Internet, a LAN (Local Area Network), and a VPN (Virtual Private Network), may be used as the network 5 irrespective of whether the network is wired or wireless.

The client terminal 30 is an information processing apparatus that is used by a user. An example of the "user" mentioned here includes, in an organization, such as a corporation that receives a provided service of an IaaS, a user who has the administrator right of a virtual machine implemented by virtualization of a server, such as a business system or the like. Although not illustrated in the drawing, it is assumed that, in addition to the client terminal 30 used by the user described above, a terminal used by an end user who actually uses the function provided by the virtual machine is also connected to the data center 1.

For example, a personal computer can be used as the client terminal 30. Furthermore, in addition to a desktop type terminal, such as the personal computer described above, various mobile terminal devices may also be used as the client terminal 30. For example, examples of the mobile terminal device include a mobile communication terminal, such as a smart phone, a mobile phone, a personal handy-phone system (PHS), or the like, and a slate-type terminal, such as a personal digital assistant (PDA), or the like.

With the client terminal 30, the type of a virtual machine that is virtualized by the information processing apparatus 10, such as the type or the performance can be specified via a dashboard screen or the like that is provided to a browser of the client terminal 30 by the portal site Web server 20. At this point, with the client terminal 30, a template desired by a user can be selected from among templates in which the type of server, an operating system (OS), middleware, a database, or the like is standardized. Consequently, a virtual system can be provided on demand. For example, by combining virtual machines associated with 3 hierarchies, i.e., a presentation hierarchy, an application hierarchy, and a data hierarchy of a Web system, a package of multiple virtual machines may also be provided as a virtual system that implements a Web service.

The portal site Web server 20 is a Web server at a portal site constructed as the front end of an IaaS. For example, the portal site Web server 20 can receive a Web request, from a browser of the client terminal 30 via the above described dashboard screen or the like, for deployment of a virtual system. In such a case, by converting the Web request related to the deployment of the virtual system to an application program interface (API), the portal site Web server 20 instructs the information processing apparatus 10 to deploy the virtual system. In addition to this, the portal site Web server 20 can also distribute a use state related to a virtual system, such as a use state of a central processing unit (CPU), a disk, or a network, deployed in the information processing apparatus 10 or can receive a request for changing the configuration of the virtual system.

The information processing apparatus 10 is a computer that provides the client terminal 30 with a service, such as an IaaS or the like. The information processing apparatus 10 is constructed such that at least one physical machine that includes one or more system boards. For example, the information processing apparatus 10 executes, as one of guest OSs, software that manages an IaaS by using virtual software that implements virtualization of a server. Hereinafter, the software that is used to manage an IaaS is sometimes referred to as "management software". For example, if the management software running on the information processing apparatus 10 receives an instruction from the portal site Web server 20 indicating that a virtual system is to be deployed, the management software deploys the virtual system on a physical machine. The "deployment" mentioned here indicates the flow of a series of processes of allocating a hardware resource included in a physical machine to a virtual machine, creating a disk image of the virtual machine, and then booting up the virtual machine.

Hierarchical structure of the information processing apparatus

Figure 2:
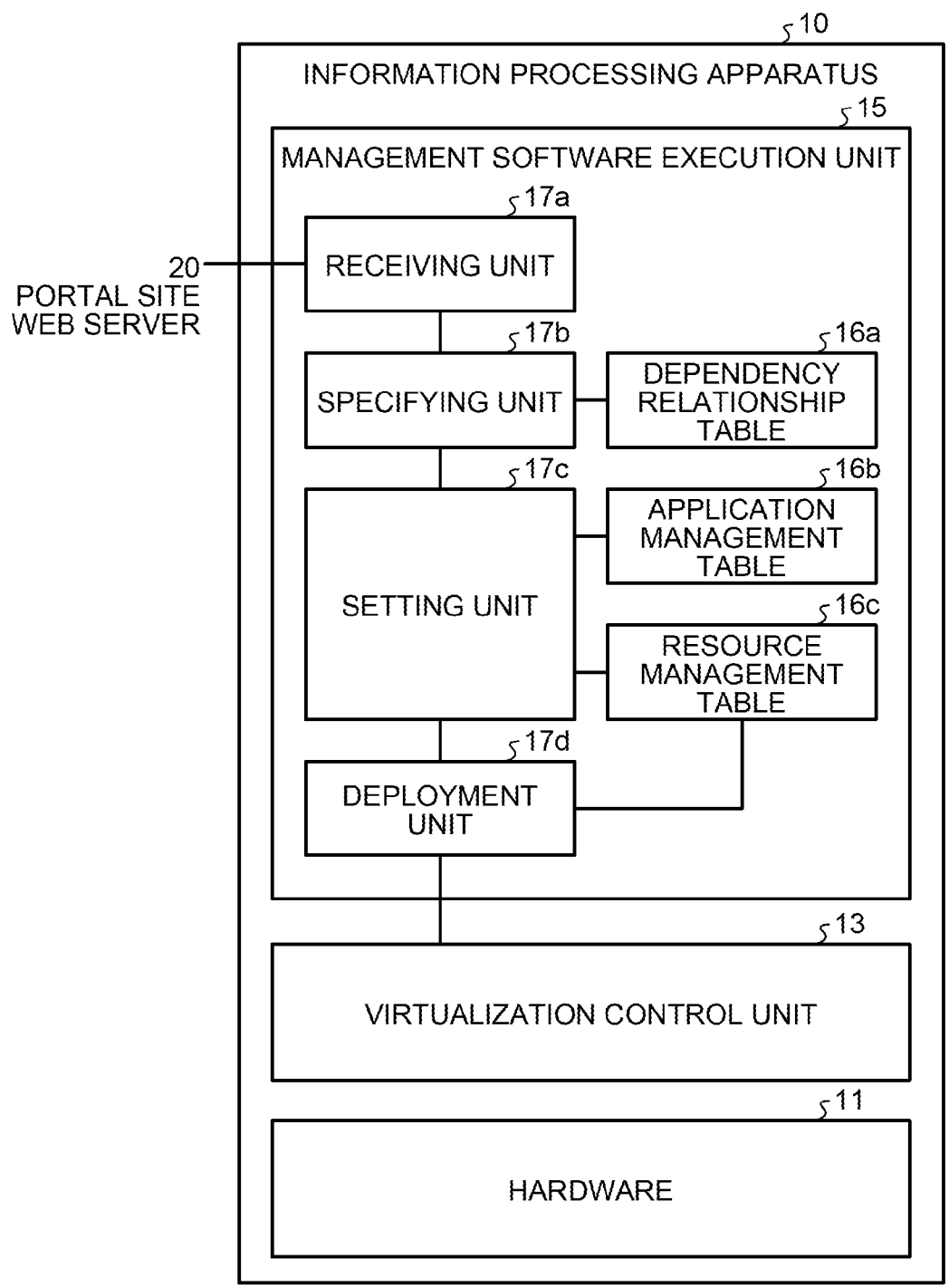
FIG. 2 is a schematic diagram illustrating an example of the hierarchical structure of an information processing apparatus according to the first embodiment.

FIG. 2 is a schematic diagram illustrating an example of the hierarchical structure of an information processing apparatus according to the first embodiment. As illustrated in FIG. 2, the information processing apparatus 10 includes hardware 11, a virtualization control unit 13, a management software execution unit 15 as the hierarchical structure in this order. Although not illustrated in FIG. 2, a virtual machine (VM) that is virtualized by the virtualization control unit 13 operates as one of the guest OSs in the same hierarchy as that of the management software.

The resources, such as a CPU memory pool, a disk pool, a network, or the like, are included in the hardware 11. The resources included in the hardware 11 are allocated to a virtual system by the virtualization control unit 13 in accordance with the type of virtual machine included in the virtual system instructed by the management software execution unit 15. In this way, by using the resource as a pool, the virtual machine can be dynamically constructed.

The virtualization control unit 13 is a processing unit that operates a virtual machine and, furthermore, a virtual system by executing virtual software. The virtualization control unit 13 can be implemented by executing a program, such as a hypervisor that is an example of virtual software.

The management software execution unit 15 is a processing unit that executes the above described management software. As illustrated in FIG. 2, the management software execution unit 15 includes a dependency relationship table 16a, an application management table 16b, a resource management table 16c, a receiving unit 17a, a specifying unit 17b, a setting unit 17c, and a deployment unit 17d. Each of the tables described above is installed in a storage device, such as a memory or the like.

The dependency relationship table 16a stores therein information that indicates the dependency relationship related to a service between virtual systems. A table in which a virtual system is associated with a virtual system on which the virtual system depends may be used as the dependency relationship table 16a. The dependency relationship described above may also be set, in advance, by an administrator of an IaaS provider, such as a designer that creates a template of a virtual system or a user of an IaaS.

FIG. 3 is a schematic diagram illustrating an example of the dependency relationship table 16a. FIG. 3 illustrates an example in which two virtual systems, such as a "VSYS A" and a "VSYS B", are extracted. Each of the "VSYS ID1" and the "VSYS ID2" illustrated in FIG. 3 is an entry in which an identifier (ID) that is identification information on the virtual system is stored. The positions of the virtual systems differ depending on their identifier, i.e., ID1 and ID2. Specifically, the "VSYS ID1" indicates identification information related to a virtual system that depends on a service provided by a process executed by another virtual system. In contrast, the "VSYS ID2" indicates identification information related to a counterpart virtual system on which the virtual system with the VSYS ID1 depends. The example illustrated in FIG. 3 indicates that the "VSYS A" depends on the service provided by the "VSYS B" and the "VSYS B" does not depend on a service provided by the other virtual system.

An example of the dependency relationship in which a virtual system depends on a service provided by a process executed by the other virtual system includes the relationship between a virtual system A that is constructed as a Web system and a virtual system B that includes Server Load Balancing (SLB) that distributes processing load. When these virtual systems are used, the Web system is not able to be operated unless the SLB is running. Accordingly, it can be said that the virtual system A depends on the service provided by the virtual system B. For another example, the relationship between the virtual system A constructed as a Web system and a virtual system Z that creates a host key of a Secure Sockets Layer (SSL). When these virtual systems are used, a host key is not created unless the virtual system Z is booted up and thus secure communication is not performed with the client terminal 30; therefore, the Web system is not able to be operated. Accordingly, it can be said that the virtual system A depends on the service provided by the virtual system Z. Furthermore, in this case, it is assumed that a provider of an IaaS creates a host key.

The application management table 16b is a table that is used to manage information related to an application executed as a virtual machine. For example, in the application management table 16b, the parameter type, of another virtual machine, that is used to create a disk image of a virtual machine associated with an application and that is attached when a resource is allocated to the other virtual machine. The value in the application management table 16b can be set, in advance, by an administrator of an IaaS provider, such as a designer who creates a template of a virtual system or a user of the IaaS.

An example of the application management table 16b that can be used includes a table in which items such as an application, a set file, the dependency direction, the parameter type, and the like are associated with each other. From among the items, the "set file" indicates a file in which the setting of an application is described. For example, a file path that stores therein the set file may be used for this item. The item of the "dependency direction" indicates the dependency direction of the parameter of a virtual system. The item of the "parameter type" indicates the type of the parameter that is used to create a disk image of an application. The "parameter" mentioned here indicates the parameter of another virtual system that is used to create a disk image and, in particular, indicates the parameter that is attached when the resource is allocated to the other virtual machine. An example of the parameter type includes information, such as a network address of a virtual machine, that is known only after the resource of the hardware 11 is allocated to the virtual machine.

Figure 4:
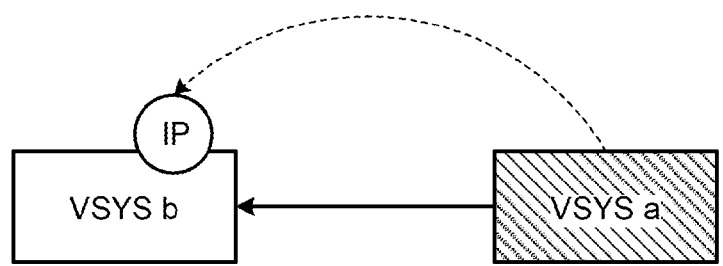
FIG. 4 is a schematic diagram illustrating an example of the dependency direction of each of a service and a parameter.
Figure 5:
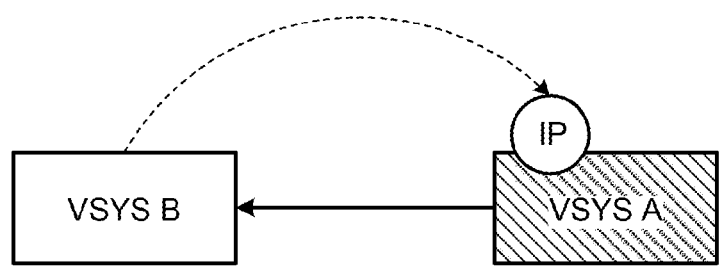
FIG. 5 is a schematic diagram illustrating an example of the dependency direction of each of a service and a parameter.

FIGS. 4 and 5 are schematic diagrams each illustrating an example of the dependency direction of each of a service and a parameter. For the arrows illustrated in FIGS. 4 and 5, the arrow illustrated by the solid line indicates the dependency direction of a service and the arrow illustrated by the broken line indicates the dependency direction of the parameter. As illustrated in FIG. 4, a VSYS depends on the service provided by a VSYS b and also depends on the parameter of the "IP address" of the VSYS b. This indicates that both the dependency direction of the service and the dependency direction of the parameter are the same. In this case, for example, the "forward direction" can be set as the dependency direction of the parameter. Furthermore, as illustrated in FIG. 5, the VSYS A depends on the service provided by the VSYS B, whereas the VSYS B depends on the parameter of the VSYS A. This indicates that the dependency direction of the service is opposite to the dependency direction of the parameter. In this case, for example, the "backward direction" can be set as the dependency direction of the parameter. As described above, by setting the dependency direction of the parameter by comparing the dependency direction of a service with that of the parameter, there is no need to define the direction by using the starting point and the end point of the ID of a virtual system that is known only after the virtual system is deployed.

FIG. 6 is a schematic diagram illustrating an example of the application management table 16b. FIG. 6 illustrates some examples related to three applications, i.e., the SLB that distributes the processing load of, for example, a Web server or a cache server; the Authentication (Auth) that authenticates the validity; and the database (DB) that manages a database, such as SQL Server or PostgreSQL. The example illustrated in FIG. 6 indicates that, from among the three applications, the "backward direction" is set in SLB and Auth as the dependency direction of the parameter, whereas the "forward direction" is set in DB, which is the remaining application, as the dependency direction of the parameter.

For example, in a case of SLB, a process is not able to be distributed to an application that is the distribution destination of the process unless the network resource, i.e., an IP address or a MAC address, that is allocated to that application is already known. Accordingly, it can be said that, for the SLB, the IP address or the MAC address, i.e., the parameter, depends on the application that is the distribution destination of the process. In contrast, from the viewpoint of the application that executes the process, the process itself is not executed unless the SLB is running. Accordingly, the application that executes the process depends on the service of distributing the processing load provided by the SLB. Because the dependency direction of the service is opposite to the dependency direction of the parameter, the "backward direction" is set in the dependency direction of the parameter.

Similarly to the above, for example, in a case of Auth, an authentication result is not able to be sent to an application that provides an authentication function unless the network resource, i.e., the IP address or the MAC address, that is allocated to that application is already known. Accordingly, it can be said that, for the Auth, the IP address or the MAC address, i.e., the parameter, depends on the application that provides the authentication function. In contrast, from the viewpoint of the application that executes a process, the authentication itself, which is the precondition of the process, is not able to be executed unless the Auth is running. Accordingly, the application that executes the process depends on the authentication service provided by the Auth. Because the dependency direction of the service is opposite to the dependency direction of the parameter, the "backward direction" is set in the dependency direction of the parameter.

For example, in a case of DB, an application that receives a provided database function is not able to read and write data unless the network resource, i.e., the IP address, of the DB is already known. Accordingly, it can be said that, for the DB, the application that receives the provided database function depends on the IP address of the DB. Furthermore, the application that receives the provided database function is not able to read and write data when the DB is not running. Accordingly, the application that executes an input/output of data depends on the service provided by the DB. Because the dependency direction of the service and the dependency direction of the parameter are the same, the "forward direction" is set in the dependency direction of the parameter.

The resource management table 16c is a table that is used to manage the resources allocated to virtual machines. An example of the resource management table 16c that can be used includes a table that includes items, such as the VSYS ID, the VM ID, the representative IP, the representative MAC, the App, the dependency pointer, and the like.

The item of the "VSYS ID" indicates, from among the pieces of identification information on virtual systems, the identification information on a virtual system targeted for a deployment request. The item of the "VM ID" indicates identification information on a virtual machine included in the virtual system. The items of the "representative IP" and the "representative MAC" indicate the IP address and the MAC address, respectively, of a representative virtual machine from among the virtual machines in the virtual system. For example, from among the virtual machines in the virtual system, the IP address and the MAC address of a virtual machine associated with the application that is stored as an entry in the application management table 16b are stored as the "representative IP" and the "representative MAC", respectively. The item of the "App" indicates the type of application that depends on the parameter of the other virtual system from among the applications included in the virtual system. The item of the "dependency pointer" indicates the reference target of an entry of the other virtual system. For example, for entries of the virtual systems that depend on the parameter of the other virtual system, the location information on an entry of the counterpart virtual system that depends on the parameter is set as the reference target in the setting unit 17c, which will be described later. From among the items described above, because the items other than the "App" and the "dependency pointer" may sometimes be used when a known resource is managed, in such a case, extension of an item in the resource management table 16c may be performed by targeting for the "App" and the "dependency pointer".

FIG. 7 is a schematic diagram illustrating an example of the resource management table 16c. FIG. 7 illustrates the resource management table 16c when the value is stored in each of the items; however, in practice, the value is stored in each of the items in the course of a process that specifies a counterpart virtual system that provides a service on which the virtual system targeted for a deployment request depends; that determines the dependency direction of the parameter; that sets a dependency pointer; and that allocates the resource. The example illustrated in FIG. 7 indicates that the VM1 and the VM2 in the virtual system with the ID of the VSYS A do not depend on the parameter of the application included in the other virtual system. Furthermore, the example illustrated in FIG. 7 indicates that the SLB (VM3) in the virtual system with the ID of the VSYS B depends on the IP address and the MAC address and indicates that the virtual system with the ID of the VSYS A is set as the reference target.

In each of the tables described above, a case in which data is managed in the table format; however, data may also be managed by another format other than the table format, such as a comma separated values (CSV) format.

The receiving unit 17a is a processing unit that receives an instruction to deploy a first virtual system. For example, the receiving unit 17a receives, via the portal site Web server 20, an API that instructs deployment of the virtual system as an instruction to deploy the first virtual system. If a deployment request is instructed from the client terminal 30 by using a timer or the like, a process may also be performed assuming that a deployment instruction has been received when, as a trigger, a previously specified virtual system satisfies the time condition.

The specifying unit 17b is a processing unit that specifies, as a second virtual system, the virtual system at the dependency destination that provides a service on which the first virtual system depends. For example, as will be described below, the specifying unit 17b searches the dependency relationship table 16a described above for a virtual system, at the dependency destination, that provides a service on which a virtual system that has received a deployment instruction depends on.

Specifically, the specifying unit 17b determines whether a virtual system with the same ID of the virtual system as that received the deployment instruction by the receiving unit 17a is present in an entry of the VSYS ID1 stored in the dependency relationship table 16a. If no virtual system with the same ID of the virtual system as that received the deployment instruction is present in an entry of the VSYS ID1, it is determined that the deployment of the virtual system that has received the deployment instruction may be independently started. In such a case, the specifying unit 17b ends the process of searching for a virtual system at the dependency destination that provides the service.

In contrast, if a virtual system with the same ID of the virtual system as that received the deployment instruction is present in an entry of the VSYS ID1, it is determined that it is difficult to independently deploy the virtual system that has received the deployment instruction. In such a case, the specifying unit 17b further determines whether a value is present in the entry of the VSYS ID2 that is associated with the VSYS ID1 that has received the deployment instruction. If no value is present in the entry of the VSYS ID2, it is determined that the deployment of the virtual system that has received the deployment instruction may be independently started. In such a case, the process of searching for a virtual system at the dependency destination that provides the service is ended. In contrast, if a value is present in the entry of the VSYS ID2, the specifying unit 17b specifies the virtual system registered in the VSYS ID2 as the virtual system at the dependency destination that provides the service.

If the specifying unit 17b was able to search for a virtual system at the dependency destination that provides the service, the specifying unit 17b repeatedly the process of searching for an entry of the VSYS ID2 until no dependency destination that provides a service is present in the virtual system at the dependency destination that provides the service. Specifically, the specifying unit 17b determines whether the virtual system that has been specified as the dependency destination that provides the service is present in the entry of the VSYS ID1. If the virtual system that has been specified as the dependency destination that provides the service is present in the entry of the VSYS ID1, the specifying unit 17b further determines whether a value of the entry of the VSYS ID2 that is associated with the VSYS ID1 that is specified as the dependency destination that provides the service is present. If a value of the entry of the VSYS ID2 is present, the specifying unit 17b specifies the virtual system registered in the VSYS ID2 as the virtual system at the dependency destination that provides the service.

The setting unit 17c is a processing unit that refers to the application management table 16b and that sets a pointer between a first virtual machine and a second virtual machine. For example, the setting unit 17c performs the following process every time a dependency destination that provides a service is searched from the dependency relationship table 16a. For example, the setting unit 17c refers to the resource management table 16c and reads the virtual machine that is included in the virtual system at the dependency source that depends on the service provided by the other virtual system. Then, the setting unit 17c searches the application management table 16b for the application that is associated with the virtual machine included in the virtual system at the dependency source. Then, if the setting unit 17c was able to search the application management table 16b for the application, the setting unit 17c determines whether the dependency direction of the parameter associated with the application is the "backward direction".

At this point, if the dependency direction of the parameter is the "backward direction", the setting unit 17c sets, from among the records stored in the resource management table 16c, a dependency pointer indicating that the record of the dependency source of the service is to be used as the reference target in the record of the virtual system at the dependency destination of the service. In contrast, if the dependency direction of the parameter is the "forward direction", the setting unit 17c sets, from among the records stored in the resource management table 16c, a dependency pointer indicating that the record of the dependency destination of the service is to be used as the reference target in the record of the virtual system at the dependency source of the service.

The deployment unit 17d is a processing unit that performs the deployment of a virtual system. For example, the deployment unit 17d can deploy, in series or in parallel, virtual systems that receive deployment instructions and the series of the virtual systems in which the dependency relationships of the service are linked starting from the virtual system that has received the deployment instruction. Hereinafter, the virtual system targeted for the deployment by the deployment unit 17d may sometimes be collectively referred to as a "virtual system targeted for deployment".

Specifically, the deployment unit 17d allocates the resource of the hardware 11 to the virtual system targeted for deployment. For example, the deployment unit 17d allows the virtualization control unit 13 to allocate a template, such as the usage rate of a CPU, a memory, or a disk, that is associated with the performance of a CPU, the capacity of a disk, or the like, that is set in each of the virtual machines included in the virtual system targeted for deployment. Furthermore, the deployment unit 17d allows the virtualization control unit 13 to allocate the resource of a network, such as a network interface card (NIC), to each of the virtual machines. Then, the deployment unit 17d creates a disk image of the virtual system.

Thereafter, the deployment unit 17d searches the resource management table 16c for a record of the virtual system that is targeted for deployment. Then, the deployment unit 17d determines whether a dependency pointer is set in the record of the virtual system that is targeted for the deployment. If a dependency pointer is set in the record of the virtual system targeted for the deployment, the deployment unit 17d attempts to acquire, in accordance with the dependency pointer, the parameter from the record of the virtual system at the dependency destination of the parameter.

At this point, if the deployment unit 17d has failed to acquire the parameter, it is determined that the allocation of the resource has not been completed in the virtual system at the dependency destination of the parameter. In this case, the deployment unit 17d retries the process that acquires the parameter from the record of the virtual system at the dependency destination of the parameter until the deployment unit 17d can successfully acquire the parameter. At this point, the deployment unit 17d may also retry the process that acquires the parameter after waiting for a predetermined time period. Alternatively, an upper limit may also be set to the number of times of acquisition retries of the parameter.

Thereafter, if the acquisition of the parameter is successful, in accordance with the file path of the set file stored in the resource management table 16c, the deployment unit 17d writes the parameter acquired from the virtual system at the dependency destination into the set file associated with the application of the dependency source and then stores the parameter in the disk image of the virtual machine. Then, the deployment unit 17d boots up the virtual system by using the disk image.

[Specific example] In the following, a specific example of the deployment of a virtual system will be described with reference to FIGS. 8 and 9. FIG. 8 is a schematic diagram illustrating an example of a timing chart. FIG. 9 is a schematic diagram illustrating an example of an example of the transition of the resource management table 16c. FIGS. 8 and 9 each illustrates an example of a case in which an instruction to deploy the virtual system with the ID of the VSYS A illustrated in FIG. 3 is given.

As illustrated in FIG. 8, at the time point T1 at which an instruction to deploy the VSYS A is received, as illustrated in FIG. 9, specifying a virtual system that provides a service on which the VSYS A depends is started in a state in which only the values associated with the VSYS ID, the VM ID, and the App are stored in each of the VSYS A and the VSYS B in the resource management table 16c. Then, because the records associated with the VSYS ID1 of "VSYS A" and the VSYS ID2 of "VSYS B" are present in the dependency relationship table 16a illustrated in FIG. 3, the VSYS B that provides a service on which the VSYS A depends is specified at a time point T2. A description will be given of a case in which only the VSYS B is specified as one of the series of the virtual systems in which the dependency relationships of the service are linked starting from the VSYS A.

As described above, at the time point T2 at which the VSYS B that provides the service on which the VSYS A depends, as illustrated in FIG. 9, a new dependency pointer is set in the resource management table 16c. This is because, in the application management table 16b illustrated in FIG. 6, the application included in the VSYS A does not depend on the parameter of the application included in the other virtual system, whereas, for the SLB included in the VSYS B, the parameter of each of the IP address and the MAC address depends on the "backward direction" that is the opposite direction of the dependency direction of the service. Consequently, a dependency pointer in the backward direction i.e., in the direction from VSYS B to the VSYS A, that is the opposite direction of the dependency direction of the service, i.e., in the direction from the VSYS A to the VSYS B. Specifically, a dependency pointer is set in the record of the VSYS B in the resource management table 16c such that the record of the VSYS A is used as the reference target.

Then, after the time point T2 at which the deployment of the VSYS B is started, the deployment of the VSYS A is started at a time point T3. However, because SLB is included in the VSYS B, the creation of a disk image is not completed unless the IP address and the MAC address allocated to the Web included in the VSYS A is already known. Thus, the deployment of the VSYS B is suspended between a time point T4 at which an attempt is made to acquire, in accordance with the dependency pointer, the IP address and the MAC address of the VSYS A from the resource management table 16c and a time point T5 at which the deployment of the resource of the VSYS A has been completed. Specifically, the process of acquiring, in accordance with the dependency pointer stored in the resource management table 16c, the IP address and the MAC address of the VSYS A is repeatedly performed until the IP address and the MAC address of the VSYS A that becomes the dependency destination of the parameter is stored in the resource management table 16c.

Then, at the time point T5 at which the deployment of the resource of the VSYS A has been completed, as illustrated in FIG. 9, the IP address and the MAC address of the VSYS A are stored in the resource management table 16c. At this stage, the acquisition of the IP address and the MAC address of the VSYS A is successful when the deployment of the VSYS B is performed. Then, at a time point T6, the deployment of the VSYS A proceeds to the creation of a disk image and the deployment of the VSYS B is also resumed. Specifically, as illustrated in FIG. 9, after the IP address and the MAC address of the VSYS B is stored in the resource management table 16c, a disk image of the VSYS B is created, the IP address and the MAC address of the Web included in the VSYS A are described in the set file of the SLB in the VSYS B, and then the created disk image is stored. Then, at a time point T7, both the VSYS A and the VSYS B are booted up and the deployment of the VSYS A and the VSYS B has been completed.

As described above, when the VSYS A that depends on the service provided by the VSYS B is deployed, even if the dependency direction of the parameter is opposite to the dependency direction of the service, i.e., is the backward direction, a deadlock does not occur when the VSYS A and the VSYS B are deployed. Specifically, after the parameter is described in the disk image of the VSYS B that depends on the parameter of the VSYS A and then the VSYS B is booted up, the VSYS A can be deployed together with the VSYS B. Furthermore, when this deployment is implemented, an agent program does not need to be embedded in a virtual machine in order to acquire the parameter of the VSYS A for the deployment of the VSYS B.

[Flow of the Processes]

In the following, the flow of the processes performed by the information processing apparatus according to the first embodiment will be described. In a description below, the processes performed by the information processing apparatus 10 will be described in the order as follows: (1) pointer setting process and (2) deployment process.

(1) Pointer Setting Process

Figure 10:
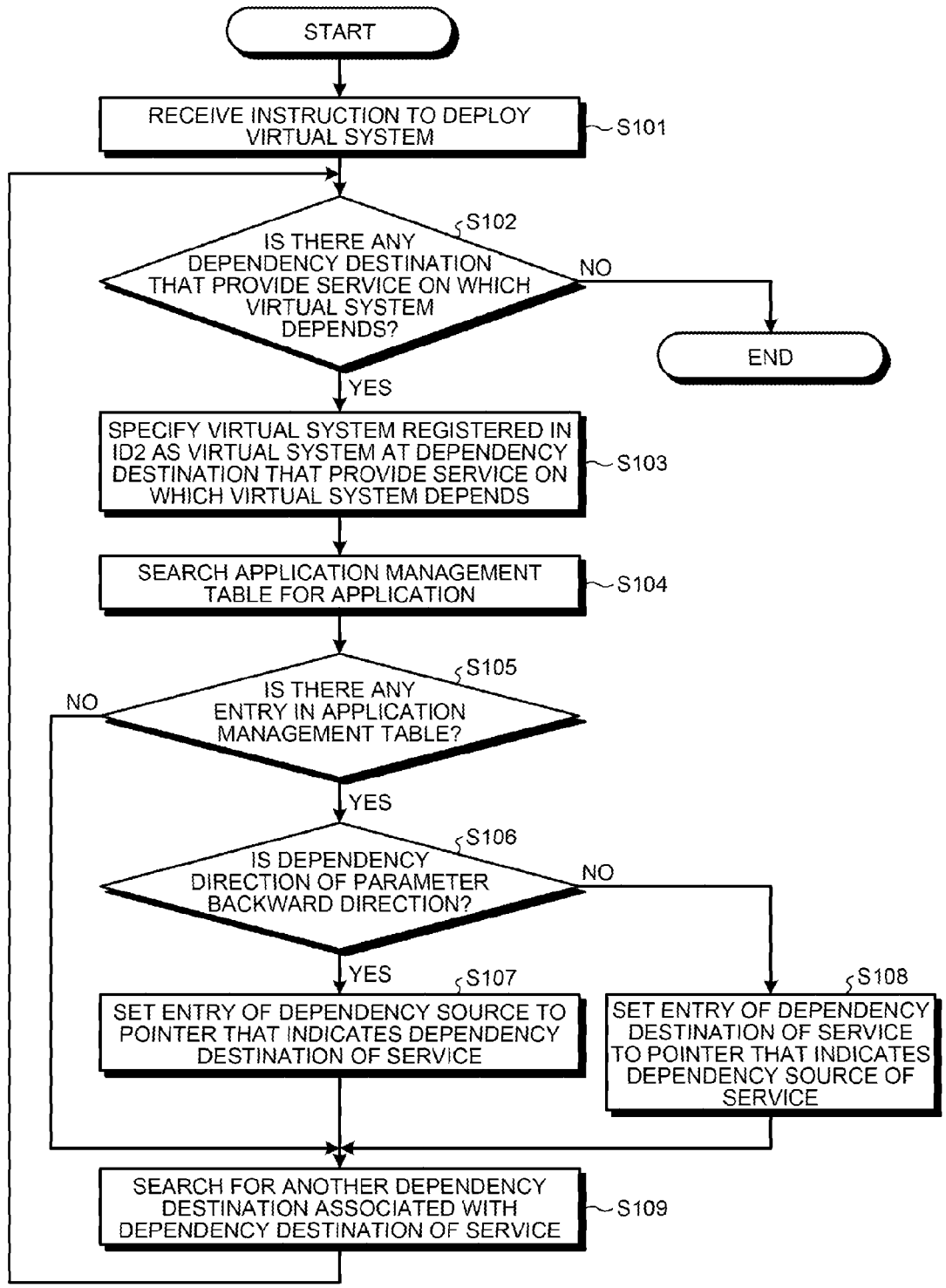
FIG. 10 is a flowchart illustrating the flow of a pointer setting process according to the first embodiment.

FIG. 10 is a flowchart illustrating the flow of a pointer setting process according to the first embodiment. This process is started when, for example, an instruction to deploy a virtual machine is received from the portal site Web server 20.

As illustrated in FIG. 10, a deployment instruction to deploy a virtual system is received from the portal site Web server 20 (Step S101). Then, the specifying unit 17b refers to the dependency relationship table 16a and determines whether a counterpart virtual system that provides a service on which the virtual system that has received the deployment instruction at Step S101 depends is present (Step S102).

If a counterpart virtual system that provides a service on which the virtual system depends is not present (No at Step S102), it is determined that the deployment of the virtual system that has received the deployment instruction can be independently started. In such a case, the specifying unit 17b ends the process without processing anything.

In contrast, if a counterpart virtual system that provides a service on which the virtual system depends is present (Yes at Step S102), the specifying unit 17b specifies the counterpart virtual system as a virtual system at the dependency destination that provides the service (Step S103).

Then, the setting unit 17c searches the application management table 16b for an application that is associated with the virtual machine included in the virtual system at the dependency source (Step S104). Thereafter, if the setting unit 17c was able to search the application management table 16b for the application (Yes at Step S105), the setting unit 17c determines whether the dependency direction of the parameter that is associated with the application is the "backward direction" (Step S106). If the setting unit 17c was not able to search the application management table 16b for the application (No at Step S105), the process proceeds to Step S109, which will be described later.

At this point, if the dependency direction of the parameter is the "backward direction" (Yes Step S106), the setting unit 17c sets a dependency pointer indicating that a record of the dependency source of the service is to be used as the reference target in a record of the virtual system at the dependency destination of the service from among the records stored in the resource management table 16c (Step S107).

In contrast, if the dependency direction of the parameter is the "forward direction" (No at Step S106), the setting unit 17c sets a dependency pointer indicating that a record of the dependency destination of the service is to be used as the reference target in a record of the virtual system at the dependency source of the service from among the records stored in the resource management table 16c (Step S108).

Subsequently, the specifying unit 17b searches the dependency relationship table 16a for another dependency destination at the dependency destination of the service specified at Step S103 on which the virtual system depends on (Step S109). Then, the processes performed at Steps S103 to S109 are performed until no further dependency destination of the service is present in the virtual system at the dependency destination of the service (Yes at Step S102). Thereafter, if no further dependency destination of the service is present in the virtual system at the dependency destination of the service (No Step S102), the specifying unit 17b ends the process.

(2) Deployment Process

Figure 11:
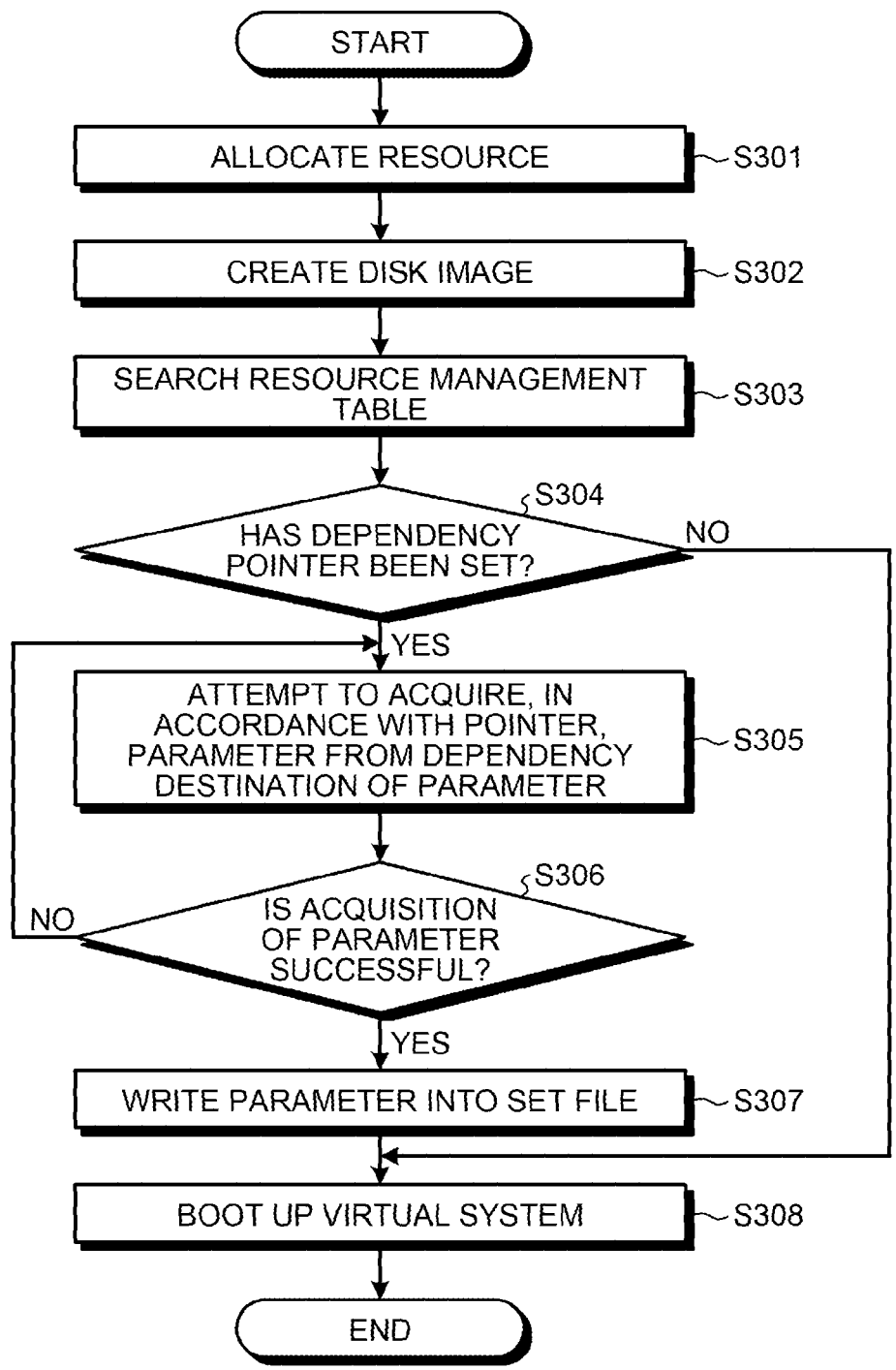
FIG. 11 is a flowchart illustrating the flow of a deployment process according to the first embodiment.

FIG. 11 is a flowchart illustrating the flow of a deployment process according to the first embodiment. It is possible to perform the process, in parallel, of deploying a virtual system that receives a deployment instruction and deploying each of the series of the virtual systems in which the dependency relationships of the service are linked starting from the virtual system that has received the deployment instruction. Specifically, the deployment of the virtual system can be started at Step S101 illustrated in FIG. 10 at which the deployment instruction has been received and, furthermore, can be started at Step S103 at which a virtual system at the dependency destination of the service is specified.

As illustrated in FIG. 11, the deployment unit 17d allocates the resource of the hardware 11 to the virtual system that is targeted for the deployment (Step S301) and creates a disk image of the virtual system to which the resource has been allocated at Step S301 (Step S302).

Then, the deployment unit 17d searches the resource management table 16c for a record of the virtual system that is targeted for the deployment (Step S303). Thereafter, the deployment unit 17d determines whether a dependency pointer has been set in the record of the virtual system targeted for the deployment (Step S304).

If a dependency pointer has been set in the record of the virtual system targeted for the deployment (Yes at Step S304), the deployment unit 17d attempts to acquire, in accordance with the dependency pointer, the parameter from the record of the virtual system at the dependency destination of the parameter (Step S305). If a dependency pointer has not been set in the record of the virtual system targeted for the deployment (No at Step S304), the process proceeds to Step S308, which will be described later.

At this point, if the acquisition of the parameter has failed (No at Step S306), it is determined that the allocation of the resource has not been completed in the virtual system at the dependency destination of the parameter. In such a case, the deployment unit 17d retries the process of acquiring the parameter from the record of the virtual system at the dependency destination of the parameter until the acquisition of the parameter is successful (Step S305).

Thereafter, if the acquisition of the parameter is successful (Yes at Step S306), the deployment unit 17d writes, in accordance with the file path of the set file stored in the resource management table 16c, the parameter acquired from the virtual system at the dependency destination into the set file associated with the application of the dependency source and then stores the data in the disk image of the virtual machine (Step S307). Then, the deployment unit 17d boots up the virtual system by using the disk image (Step S308) and ends the process.

Advantage of the First Embodiment

As described above, when the information processing apparatus 10 according to the first embodiment deploys the virtual system A, the information processing apparatus 10 sets a pointer that indicates the virtual system A in the virtual system B that provides a service on which the virtual system A depends. Then, the information processing apparatus 10 according to the first embodiment writes the parameter that is attached when the resource is allocated to the virtual system A into a disk image of the virtual system B and then boots up the virtual system B. Consequently, the information processing apparatus 10 according to the first embodiment can deploy the virtual system A that depends on the service provided by the virtual system B.

[b] Second Embodiment

In the above explanation, a description has been given of the embodiments of the device according to the present invention; however, the present invention can be implemented with various kinds of embodiments other than the embodiments described above. Therefore, another embodiment included in the present invention will be described below.

Application Example 1

In the first embodiment described above, a description has been given of a case in which the deployment is performed for each virtual system as a unit; however, the deployment may also be performed for each virtual machine as a unit. In such a case, for example, the granularity of information managed by the dependency relationship table 16a and the resource management table 16c may also be used as a unit of virtual machine. FIG. 12 is a schematic diagram illustrating an application example of the dependency relationship table. FIG. 13 is a schematic diagram illustrating an application example of the resource management table. For example, as illustrated in FIG. 12, an entry of the virtual machine included in the virtual system with the VSYS ID1 is added to the dependency relationship table 16a illustrated in FIG. 3. Then, as illustrated in FIG. 13, the record of the resource management table 16c illustrated in FIG. 7 is created for each virtual machine. Consequently, even if the deployment is performed for each virtual machine unit as a unit, it is possible to perform the processes illustrated in FIGS. 10 and 11. Consequently, even when a virtual machine in which a template is not set is deployed, the management software execution unit 15 can also be mounted.

Application Example 2

In the first embodiment described above, a description has been given of a case in which the management software execution unit 15 stores therein the dependency relationship table 16a; however, the dependency relationship table 16a is not always stored. In such a case, the client terminal 30 declares a virtual system that is targeted for a deployment request and a virtual system at the dependency destination that provides a service on which the virtual system targeted for the deployment request depends.

Figure 14:
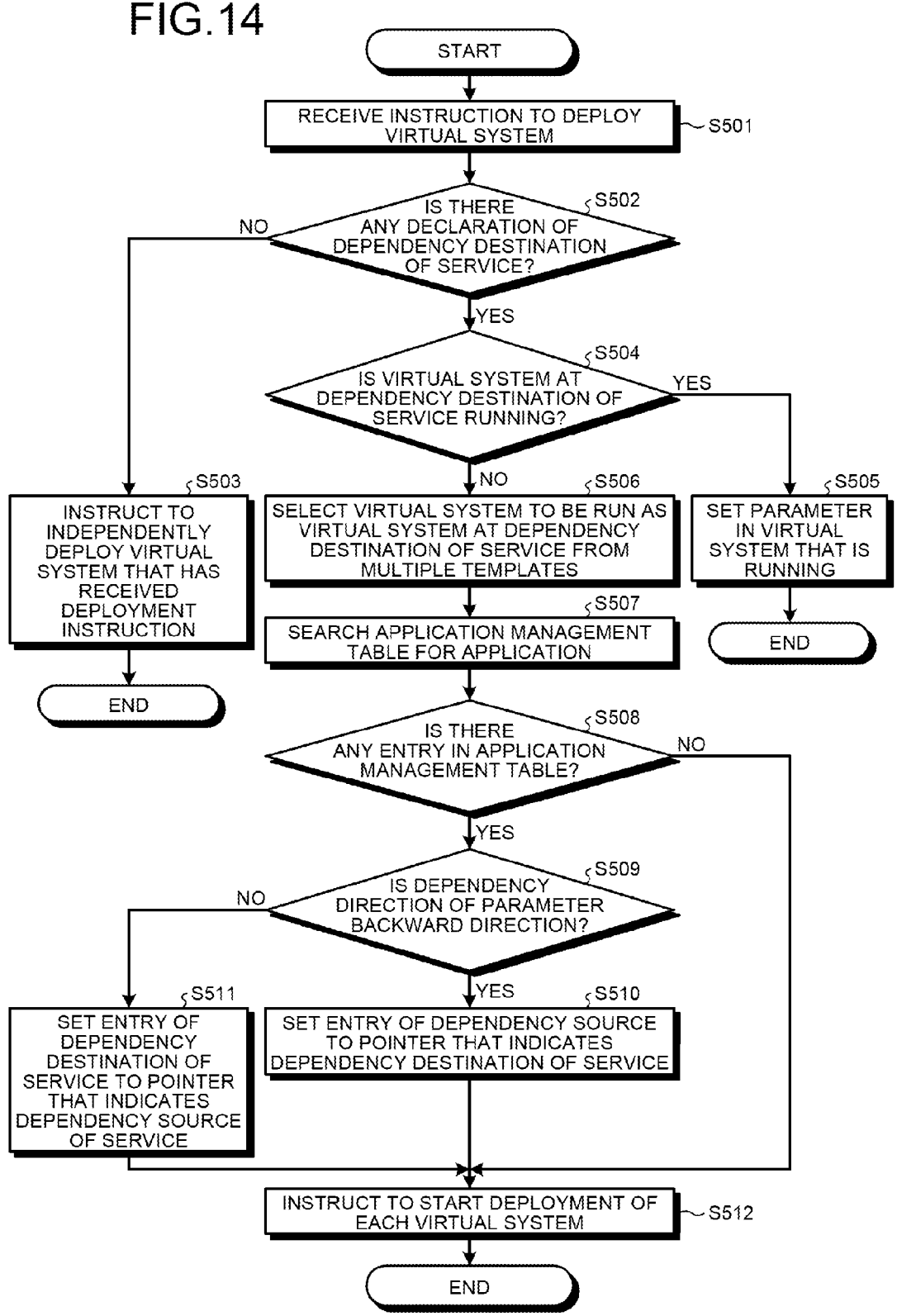
FIG. 14 is a flowchart illustrating the flow of a pointer setting process according to the application example.

FIG. 14 is a flowchart illustrating the flow of a pointer setting process according to the application example. Similarly to the pointer setting process illustrated in FIG. 10, this pointer setting process is started when a deployment instruction is received from the portal site Web server 20.

As illustrated in FIG. 14, a deployment instruction of the virtual system is received from the portal site Web server 20 (Step S501). Then, the specifying unit 17b determines whether the dependency destination of the service is included in the deployment instruction (Step S502).

At this point, if the dependency destination of the service is not included in the deployment instruction (No at Step S502), the specifying unit 17b instructs the deployment unit 17d to independently deploy the virtual system that has received the deployment instruction at Step S501 (Step S503) and then ends the process.

In contrast, if a declaration of the dependency destination of the service is included in the deployment instruction (Yes at Step S502), the specifying unit 17b refers to the resource management table 16c and determines whether the virtual system at the dependency destination of the service is running (Step S504).

An example of a case in which the virtual system at the dependency destination of the service has already been started up is a case as follows. For example, it is assumed that a virtual system that has received a deployment instruction includes a virtual machine of a Web and a virtual system at the dependency destination that provides the service on which the virtual system depends includes an SLB. At this point, if the SLB has been deployed in accordance with the deployment of a Web of another user or if the deployment instruction indicates that the virtual system of the Web is to be replicated due to load distribution performed by the same user, there may be a case in which the SLB has already been deployed.

In this way, if the virtual system at the dependency destination of the service has already been booted up and is running (Yes Step S504), the specifying unit 17b instructs to set the parameter, such as the IP address and the MAC address, of the virtual system that has received the deployment instruction in the set file stored in the disk image of the already deployed virtual system (Step S505) and then ends the process.

In contrast, if the virtual system at the dependency destination of the service is not running (No at Step S504), the specifying unit 17b selects a virtual system at the dependency destination of the service from multiple templates (Step S506). For example, if the client terminal 30 has already been joined in the service of an IaaS provider, it is possible to select, as the virtual system of the dependency destination of the service, a template whose condition matches the item, such as the type of the server including, for example, the performance of a CPU, the type of an OS, the capacity of a disk, or the like, that has been registered at the time of joining. Furthermore, a template with the lowest usage fee may also be selected as the virtual system at the dependency destination of the service.

Then, the setting unit 17c searches the application management table 16b for an application associated with the virtual machine included in the virtual system at the dependency source (Step S507). If the setting unit 17c was able to search the application management table 16b for the application (Yes at Step S508), the setting unit 17c determines whether the dependency direction of the parameter associated with the application is the "backward direction" (Step S509). If the setting unit 17c was not able to search the application management table 16b for the application (No at Step S508), the process proceeds to Step S512, which will be described later.

At this point, if the dependency direction of the parameter is the "backward direction" (Yes at Step S509), the setting unit 17c sets a dependency pointer indicating that the record of the dependency source of the service is to be used as the reference target in the record of the virtual system at the dependency destination of the service from among the records stored in the resource management table 16c (Step S510).

In contrast, if the dependency direction of the parameter is the "forward direction" (No at Step S509), the setting unit 17c sets a dependency pointer indicating that the record of the dependency destination of the service is to be used as the reference target in the record of the virtual system at the dependency source of the service from among the records stored in the resource management table 16c (Step S511).

Then, the setting unit 17c instructs the deployment unit 17d to start the deployment of the virtual system that has received the deployment instruction and the virtual system at the dependency destination of the service (Step S512) and then ends the process.

As described above, by declaring a virtual system at the dependency destination of the service when a deployment request for a virtual system is made, it is possible to reduce the load applied to the designing of a template.

Modification

In the first embodiment described above, the management software execution unit 15 includes the dependency relationship table 16a; however, it may also be possible to embed, in a definition file in a template that is used to deploy a virtual system, a virtual system at the dependency destination that provides the service on which the virtual system depends. For example, a description of "require SLB" may be embedded at the top of the definition file in the template.

Separation and Integration

The components of each unit illustrated in the drawings are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Hardware

The various processes described in the embodiments can be implemented by a program prepared in advance and executed by a computer such as a personal computer or a workstation. Accordingly, in the following, a description will be given of an example of a computer system that executes the program having the same function as that performed in the embodiments described above.

Figure 15:
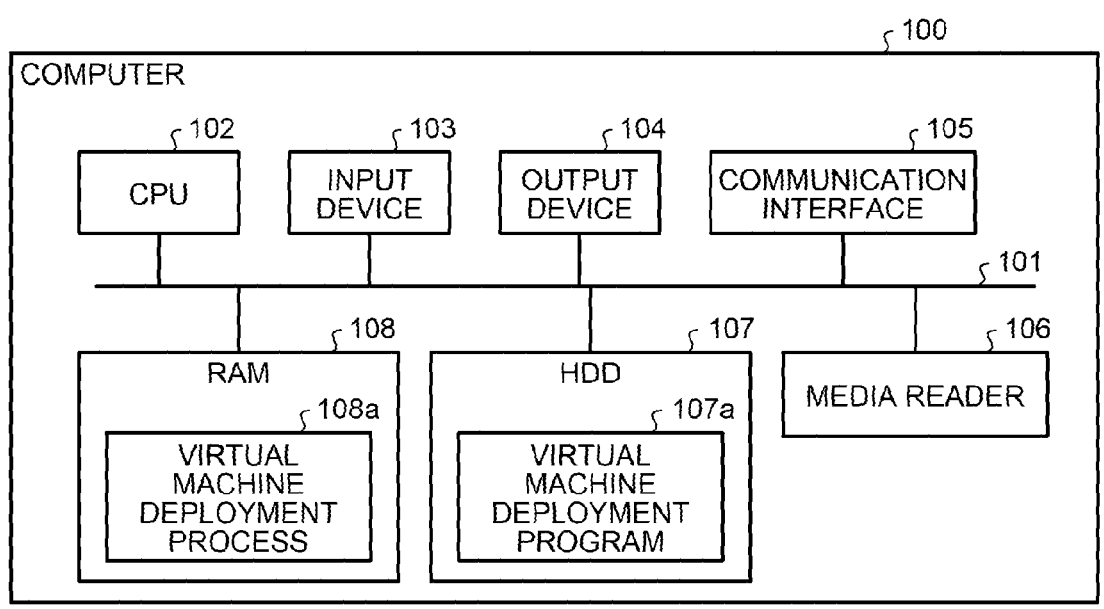
FIG. 15 is a block diagram illustrating the hardware configuration of a computer that executes a virtual machine deployment program.

FIG. 15 is a block diagram illustrating the hardware configuration of a computer that executes a virtual machine deployment program. As illustrated in FIG. 15, a computer 100 includes a CPU 102, an input device 103, an output device 104, a communication interface 105, a media reader 106, a hard disk drive (HDD) 107, and a random access memory (RAM) 108. Furthermore, the units illustrated in FIG. 15 are connected with each other via a bus 101.

The input device 103 is a mouse or a keyboard; the output device 104 is, for example, a display; and the communication interface 105 is an interface, such as an NIC or the like. The HDD 107 stores therein the information stored in each of the tables illustrated in FIGS. 3, 6, and 7 together with a virtual machine deployment program 107a. The HDD 107 is described as an example of the recording medium. Alternatively, various programs may also be stored in another computer readable recording medium, such as a read only memory (ROM), a RAM, a CD-ROM or the like and may also be read by a computer. Furthermore, a program may also be obtained and used by deploying a storage medium at a remote site and by a computer accessing the storage medium. Furthermore, at this point, the obtained program may also be stored in the recording medium in the computer.

The CPU 102 reads the virtual machine deployment program 107a and loads the program in the RAM 108, thus operating a virtual machine deployment process 108a that executes each of the functions described above with reference to FIG. 3 or the like. Specifically, the virtual machine deployment process 108a executes the same function as that performed by the receiving unit 17a, the specifying unit 17b, the setting unit 17c, and the deployment unit 17d illustrated in FIG. 2. In this way, by reading and executing the program, the computer 100 operates as an information processing apparatus that executes the virtual machine deployment method.

Furthermore, the computer 100 reads the virtual machine deployment program 107a from the recording medium by the media reader 106 and executes the read virtual machine deployment program 107a, thereby implementing the same function as that described in the embodiments. The program mentioned in the second embodiment is not limited to the program executed by the computer 100. For example, the present invention may also be used in a case in which another computer or a server executes the program or in which another computer or a server cooperatively executes the program with each other.

According to an aspect of an embodiment of the present invention, an advantage is provided in that a virtual machine that depends on a service provided by another virtual machine.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A virtual machine deployment method comprising:
specifying, using a processor, a second virtual machine that provides a service on which a first virtual machine depends;
determining, using the processor, whether a dependency direction of a service and a dependency direction of a parameter are opposite from one another for the first virtual machine by referring to application information which associates an application with information on whether the dependency direction of the service and the dependency direction of the parameter are opposite or not between a virtual machine associated with the application and another virtual machine;
setting, using the processor, a pointer which causes the second virtual machine to refer to a parameter that is used to create a disk image of the first virtual machine when the dependency direction of the service and the dependency direction of the parameter are opposite for the first virtual machine;
setting, using the processor, the pointer indicating that the second virtual machine is to be used as a reference target when the dependency direction of the service and the dependency direction of the parameter are not opposite for the first virtual machine; and
deploying, using the processor, the first virtual machine and the second virtual machine by creating, in accordance with the pointer, a disk image of the second virtual machine from the parameter that is set when a resource of the first virtual machine is allocated.

2. The virtual machine deployment method according to claim 1, wherein the specifying includes specifying the second virtual machine by receiving a request for the first virtual machine to be deployed and a notification of a virtual machine that provides a service on which the first virtual machine depends.

3. The virtual machine deployment method according to claim 1, wherein
the specifying includes specifying a second virtual system that includes the second virtual machine and that provides a service on which a first virtual system that includes the first virtual machine depends,
the determining includes determining whether the dependency direction of the service and the dependency direction of the parameter are opposite from one another for the first virtual system by referring to the application information,
the setting includes setting the pointer which causes the second virtual system to refer to a parameter that that is used to create a disk image of the first virtual system, when the dependency direction of the service and the dependency direction of the parameter are opposite for the first virtual system, and
the deploying includes deploying the first virtual system and the second virtual system by creating, in accordance with the pointer, a disk image of the second virtual system from a parameter that is set when a resource of the first virtual system is allocated.

4. A non-transitory computer-readable recording medium having stored therein a virtual machine deployment program that causes a computer to execute a process comprising:
specifying a second virtual machine that provides a service on which a first virtual machine depends;
determining whether a dependency direction of a service and a dependency direction of a parameter are opposite from one another for the first virtual machine by referring to application information which associates an application with information on whether the dependency direction of the service and the dependency direction of the parameter are opposite or not between a virtual machine associated with the application and another virtual machine;
setting a pointer which causes the second virtual machine to refer to a parameter that is used to create a disk image of the first virtual machine, when the dependency direction of the service and the dependency direction of the parameter are opposite for the first virtual machine;
setting the pointer indicating that the second virtual machine is to be used as a reference target when the dependency direction of the service and the dependency direction of the parameter are not opposite for the first virtual machine; and
deploying the first virtual machine and the second virtual machine by creating, in accordance with the pointer, a disk image of the second virtual machine from the parameter that is set when a resource of the first virtual machine is allocated.

5. An information processing apparatus comprising:
a memory; and
a processor coupled to the memory, wherein the processor executes a process comprising:
specifying a second virtual machine that provides a service on which a first virtual machine depends;
determining whether a dependency direction of a service and a dependency direction of a parameter are opposite from one another for the first virtual machine by referring to application information which associates an application with information on whether the dependency direction of the service and the dependency direction of the parameter are opposite or not between a virtual machine associated with the application and another virtual machine;
setting a pointer which causes the second virtual machine to refer to a parameter that is used to create a disk image of the first virtual machine, when the dependency direction of the service and the dependency direction of the parameter are opposite for the first virtual machine;
setting the pointer indicating that the second virtual machine is to be used as a reference target when the dependency direction of the service and the dependency direction of the parameter are not opposite for the first virtual machine; and
deploying the first virtual machine and the second virtual machine by creating, in accordance with the pointer, a disk image of the second virtual machine from the parameter that is set when a resource of the first virtual machine is allocated.

* * * * *